3,651,151
PREPARATION OF POLYPHENYL ETHER FROM DIHYDRIC PHENOLS
Robert F. Bridger, Hopewell, Robert E. Kinney, Lawrenceville, and Albert L. Wililams, Princeton, N.J., assignors to Mobil Oil Corporation
No Drawing. Continuation-in-part of application Ser. No. 490,072, Sept. 24, 1965, which is a continuation-in-part of application Ser. No. 416,127, Dec. 4, 1964. This application May 12, 1969, Ser. No. 823,943
Int. Cl. C07c *41/04*
U.S. Cl. 260—613 R
6 Claims

ABSTRACT OF THE DISCLOSURE

Dihydric phenols can be used directly in the Ullmann ether synthesis by using a copper salt catalyst and an amine solvent that dissolves the catalyst by forming coordinate covalent bonds with copper ions.

CROSS-REFERENCE TO RELATED APPLICATIONS

This application is a continuation-in-part of copending application Ser. No. 490,072, filed Sept. 24, 1965, and now Pat. No. 3,450,772 which is a continuation-in-part application Ser. No. 416,127, filed Dec. 4, 1964, now abandoned.

BACKGROUND OF THE INVENTION

Field of the invention

This application is related to the manufacture of polyphenyl ethers. It is more particularly concerned with a process for preparing such ethers from dihydric phenols directly in one step.

Description of the prior art

As is well known to those familiar with the art, polyphenyl or polyaryl ethers have been prepared by the Ullmann ether synthesis for use as lubricants in extreme environments. This synthesis involves the reaction between an alkali-metal salt of a monohydric phenol and an aryl halide in the presence of copper metal or a copper salt catalyst. In general, the reaction is carried out at temperatures in the order of 200° C. and higher. Attempts to cary out the Ullmann ether synthesis directly with dihydric phenolic compounds have been unsuccessful, however, because the dihydric phenols are unstable in the presence of alkali under the conditions required for the reaction. For example, resorcinol cannot be reacted with two moles of bromobenzene to form meta-diphenoxybenzene, or even with one mole to form meta-phenoxyphenol. Instead, one hydroxyl group must be blocked, as by converting it to a monoalkyl ether. Then, the remaining hydroxyl group will undergo the Ullmann reaction. After this, the blocking methyl group is removed by reaction with HBr in acetic acid to produce phenoxyphenol, which can then be further reacted in the Ullmann ether synthesis. Usually, the polyphenyl ethers prepared in this manner have poor oxidation stability, because of the presence of small amounts of ring-substituted methyl groups introduced during the formation of the monomethyl ether.

In U.S. Pat. No. 3,294,846, it is taught that when using copper oxide catalyst and a mono-salt of resorcinol in a dialkylamide, such as dimethyl formamide, phenoxyphenols are formed. As is demonstrated hereinafter, when the di-salt is used with a copper salt catalyst in formamide, phenoxyphenol is the predominant product. On the other hand, using the di-salt and copper salt catalyst in an amine, preferably pyridine, diphenoxybenzene is by far the predominant product.

SUMMARY OF THE INVENTION

It has been discovered that dihydric phenolic compounds will react directly in a polyphenyl ether synthesis, when the reaction is carried out, in the presence of copper salt catalyst, in amine solvents that form coordinate covalent bonds with copper ions, whereby the copper salt is dissolved, and under conditions to exclude oxygen and molecular oxygen-containing gases from the reaction system.

In general, the present invention provides a method for carrying out a polyaryl ether synthesis that comprises reacting in the absence of molecular oxygen, an alkali metal di-salt of a dihydric phenol reactant with an aryl halide reactant in the presence of a copper salt catalyst and in an amine solvent that forms coordinate covalent bonds with copper ions.

DESCRIPTION OF SPECIFIC EMBODIMENTS

In carrying out the process of this invention, it is essential that oxygen and molecular oxygen-containing gases be excluded. Thus, the process must be carried out in the absence of molecular oxygen. This can be accomplished by various means well known to those skilled in the art. For example, the process can be carried out under a blanket of inert (to the reaction) gases, such as nitrogen and flue gas.

A wide variety of dihydric phenols can be reacted with an aryl halide reactant in accordance with this invention. The dihydric phenols can, if desired, contain ring substituents, such as aryl, alkyl, aroxy, alkoxy, chloro, fluoro, trifluoroalkyl, acyl, ester, and nitro groups. Non-limiting examples of the dihydric phenolic compounds reactants are resorcinol; catechol; hydroquinone; 2,7-dihydroxynaphthalene; 3,4-dihydroxyphenanthrene; 4-methoxyresorcinol; 4-methylresorcinol; 4-benzoylresorcinol; 4-isobutylresorcinol; 2-methoxyresorcinol; and 2,4-dinitroresorcinol 2-acetylhydroquinone.

In order to undergo the polyphenyl ether synthesis, in accordance with this invention, the dihydric phenolic compound reactant is converted into its alkali metal di-salt. This can be accomplished by known methods of reacting the hydroxyl group with a basic alkali metal compound, such as the alcoholate (methoxide), hydride, or hydroxide. Although any basic alkali metal compound can be used, the sodium and potassium compounds are generally used and are preferred. As both hydroxyl groups are to be reacted with an aryl halide, both must be converted to the alkali metal salt, i.e., using substantially stoichiometric amounts of the basic alkali metal compound. An excess of basic compound should be avoided, because it interferes with the reaction and reduces yield. Water also slows the reaction and reduces yield. Accordingly, as when aqueous KOH or NaOH is used, steps should be taken to remove water, such as by azeotropic distillation with benzene, toluene, or the like.

A large number of aryl mono- or di-halide reactants will undergo reaction in accordance with this invention. Although chlorides, bromides, or iodides are utilizable, the bromides are usually preferred. Aryl chlorides are slower reacting than the bromides. Hence, when the aryl nucleus has both chloro and bromo substituents, the reaction is substantially selective for the bromo group, leaving the chloro group intact. The aromatic nucleus of the aryl halide reactant can be substituted, if desired, with substituents, such as aryl, alkyl, aroxy, alkoxy, fluoro, perfluoroalkyl, acyl, ester, or nitro groups. Non-limiting examples of the aryl halide reactant include bromobenzene; chlorobenzene; iodobenzene; 1-bromo-4-chlorobenzene; 5-bromoacenaphthene; 3-chloroacenaphthene; o-bromoanisole; bromoacetophenone; o-iodoanisole; 1,2-dinitro-4- bromobenzene; m-chlorodiphenyl; p-bromodiphenyl; p-bromochlorobenzene; α-naphthylbromide; β-naphthylchloride; m-bromonitrobenzene; 1-chloro-4-nitronaphthalene; o-bromophenetole; p-chlorophenetole; m-bromotoluene; 5-bromo-m-xylene; 2-chloro-p-xylene; m-dibromobenzene; m-diiodobenzene; p-dibromobenzene; 2,3-bis(4-bromophenyl)-ether; 2-bromo-6-chloronaphthalene; 1,4-dibromonaphthalene; 2,5-dibromotoluene; 3-bromo-4-chloronitrobenzene; and 2,6-diiodonaphthalene.

In accordance with this invention, the reaction between the alkali metal salt of the dihydric phenolic compound reactant and the aryl halide reactant is catalyzed by copper salts. Cupric and cuprous salts can both be used. Utilizable catalysts include cuprous chloride, cupric chloride, cuprous bromide, cupric bromide, cupric acetate, cupric sulfate, cupric acetylacetonate, and cuprous sulfate. As discussed hereinbefore, water appears to slow the reaction and decrease yields. Accordingly, in preferred practice of this invention, anhydrous copper salts should be used. The amount of catalyst used does not appear to be a critical factor. In practice, the process of this invention has been carried out using as little as 0.01 mole copper salt and as much as 0.25 mole per mole dihydric phenolic compound reactant.

An essential aspect of the process of this invention is the use of a suitable solvent. The solvents utilizable herein are characterized by the fact that they are polar organic amine solvents that form coordinate covalent bonds with copper ions. The utilizable solvents dissolve at least part of the copper catalyst and the phenate salt reactant. Types of solvents that are useful include aliphatic and aromatic amines which term is meant to include heterocyclic amines, such as pyridine. The suitability of any particular amine solvent for use in the process of this invention can be readily determined by those skilled in the art. Upon adding a copper salt, e.g., cuprous chloride, to a portion of the solvent and warming, a characteristic blue or green color of the Werner coordination complex becomes evident with solvents utilizable herein and at least a portion of the copper salt dissolves. Non-limiting examples of solvents are amylamine; di-n-propylamine; di-n-butylamine; 2-ethylhexylamine; n-decylamine; aniline; N-amylaniline; m-ethylaniline; toluidine; caprolactam; pyridine; quinoline; pyrazole; thiazole; 2,3-dimethylthiophene; 2-methylthiophene; and 1-methyl-2-pyrrolidinone.

The amount of amine solvent used in the reaction of this invention does not appear to be a critical factor. There should be used an amount sufficient to provide easy handling of reactants and products, and to at least partially dissolve the catalyst complex and the phenate salt reactant. It will be noted that complete solution of the catalyst and the phenate salt are not necessary, because, as reaction thus proceeds, additional solution can take place until reaction is substantially complete. On the other hand, an excessive amount of solvent can slow the reaction rate. Typical, feasible amounts of solvent for various catalysts and phenol salt reactants are illustrative in the specific working examples.

The process of this invention is readily carried out at temperatures between about 50° C. and about 200° C. Higher temperatures can be used, but they generally serve no useful purpose. Preferably, temperatures between about 100° C. and about 175° C. will be used. In many cases, operating at or near refluxing temperature is satisfactory, such as with pyridine (about 117° C.). The time of reaction will be between about one hour and about 200 hours. As in most chemical processes, the temperature and time of reaction are inversely related. A major factor influencing time of reaction is the aryl halide reactant used. As mentioned hereinbefore, the chlorides are slower to react and, therefore, can require up to 200 hours. On the other hand, when bromides are used, reaction time can be between about 3 hours and about 15 hours.

The products made by the process of this invention can be separated from the reaction mixture by techniques well known to those skilled in the art.

In general, as much of the solvent as possible is distilled off and the remaining reaction mixture is contacted with acidified water to remove the catalyst. In the case of water-soluble solvents, any remaining solvent will dissolve in the aqueous phase. When using basic solvents (e.g., pyridine), there should be sufficient acid used to neutralize the solvent remaining. Then, the crude product is extracted with a paraffinic or aromatic hydrocarbon solvent (e.g., hexane, pentane, heptane, benzene, and toluene). In general, the reaction products are obtained as the residue, after unreacted material and by-products have been removed. Products that have hydroxyl groups, i.e., acidic products, such as phenoxyphenol can be separated by extraction with aqueous caustic. Neutral products can be purified by distillation or by recrystallization from acetone, alcohol, light petroleum solvents, aromatic hydrocarbons, etc. Typical techniques are demonstrated in the specific examples, infra.

The process of this invention permits the use of dihydric phenolic compounds in the synthesis of polyaryl ethers, without the necessity of resorting to the use of blocking groups and of a plurality of process steps. Thus, various polyaryl ethers can be prepared directly. Some of these are believed to be new compounds. Many known polyphenyl ethers, however, can now be made directly either by using both hydroxyl groups of dihydric phenolic compound, e.g., meta-diphenoxybenzene or by using only one hydroxyl group, e.g., meta-phenoxyphenol. In general, both types of compounds are formed, but one will predominate.

The polyphenyl ethers are useful as synthetic lubricants and as lubricant components. The liquid compounds can be used directly as lubricants. The normally solid compounds can be used as lubricants in admixture with liquid polyphenyl ethers or with mineral lubricating oil.

The following examples are for the purpose of illustrating the process of this invention. It is not to be limited to the reactants and solvents used in the examples. As will be apparent to those skilled in the art, a variety of other reactants and solvents can be employed.

EXAMPLE 1

A suspension of 10.6 g. (0.196 mol) of sodium methoxide in 200 ml. of benzene was prepared by stirring under a pure nitrogen stream in a 500 ml. flask. The flask was also fitted with a stirrer, a dropping funnel, and a condenser arranged for distillation. All reactions in the flask are carried out under nitrogen. Then, 11.0 g. (0.100 mol) of resorcinol were added. Heat was applied and benzene and methanol were distilled off to leave a white powder of the resorcinol salt. When the salt had cooled the condenser was arranged for reflux, taking care to exclude air. Then, 200 ml. of pyridine were added. The stirred mixture was brought to reflux and 42 ml. (0.40 mol) of bromobenzene were added in a stream through the dropping funnel. This was followed at once by the addition of 3.0 g. of cuprous chloride. The reaction mixture was brought back to reflux (117° C.) and held at reflux for nine hours under a blanket of nitrogen. After this period of heating, the reaction mixture was poured into 600 ml. of water containing 20 ml. of hydrochloric acid. Additional hydrochloric acid was added until the mixture showed acid to pH paper. The product was extracted into four 200 ml. portions of n-pentane. The pentane solution was freed of solids by filtration. Removal of the n-pentane by distillation left 42.8 g. of residue. Distillation at 0.1 mm. of mercury removed the bromobenzene from the residue. The crude product remaining (20 g.) crystallized on cooling. These crystals were recrystallized from 95% ethanol to give 18.4 g. (70% yield based on resorcinol) of purified meta-diphenoxybenzene melting at 60.0–60.5° C. (literature M.P. is 61.5° C.). The identity of the product was confirmed by comparison of the gas chromatogram and the infrared spectrum with those of an authentic sample.

*Analysis.*—Found (percent): C, 82.29; H, 5.58. Calculated (percent): C, 82.42; H, 5.38.

EXAMPLE 2

A suspension of 10.3 g. (0.190 mol) of sodium methoxide in 250 ml. of benzene was prepared by stirring under a pure nitrogen stream in a 500 ml. flask. All reactions in the flask are carried out under nitrogen. Then 11.0 g. (0.100 mol.) of resorcinol were added. Heat was applied and benzene and methanol were distilled off to leave a white powder of the resorcinol salt. When the salt had cooled the condenser was arranged for reflux. Then 200 ml. of pyridine were added. The stirred mixture was brought to reflux and 74.6 g. (0.300 mol) of para-phenoxyphenol bromide were added in a stream through the dropping funnel. This was followed at once by the addition of 3.0 g. of cuprous chloride. The reaction mixture was brought to reflux (117° C.) and held at reflux for 8 hours under a blanket of nitrogen. After this period of heating, the reaction mixture was poured into 1200 ml. of water. Then 260 ml. of concentrated hydrochloric acid were added with stirring. When the solvents had separated, the water layer was siphoned off. The organic layer was taken up in 200 ml. of benzene and filtered free of solids. The solids were washed with 100 ml. of benzene. The benzene solution was washed with 200 ml. of water. Acids were then extracted from the benzene solution by 11.2 g. (0.20 mol) of potassium hydroxide in 200 ml. of water. The benzene solution was then washed with two 150 ml. portions of water. Benzene was then removed by distillation. The para-phenoxyphenyl bromide was then distilled off at 2 mm. of mercury pressure. Distillation was continued at 0.1 mm. to yield 30.4 g. of distilled product, which crystallized overnight. These crystals were recrystallized from absolute ethanol to give 25.6 g. (58% yield based on resorcinol) of purified meta-bis(para-phenoxyphenoxy)benzene melting at 86.5°–87.0° C. (literature M.P. 87.8–88.9° C.).

*Analysis.*—Found (percent): C, 80.50; H, 5.06. Calculated (percent): C, 80.69; H, 4.97.

EXAMPLE 3

A suspension of 10.6 g. (0.196 mol) of sodium methoxide in 200 ml. of benzene was prepared by stirring under a pure nitrogen stream in a 500 ml. flask. All reactions in the flask are carried out under pure nitrogen. Then, 16.0 g. (0.100 mol) of 2,7-dihydroxynaphthalene were added. Heat was applied and benzene and methanol were distilled off to leave a pale yellow powder of the dihydroxynaphthalene salt. When the salt had cooled the condenser was arranged to reflux. Then 200 ml. of pyridine were added. The stirred mixture was brought to reflux and 42 ml. (0.40 mol) of bromobenzene were added in a stream through the dropping funnel. This was followed at once by the addition of 3.0 g. of cuprous chloride. The reaction mixture was brought to reflux (117° C.) and held at reflux for 9 hours under a blanket of nitrogen. After this period of heating the reaction mixture was poured into 600 ml. of water containing 20 ml. of concentrated hydrochloric acid. Additional hydrochloric acid was added until the mixture was shown to be acid to pH paper. Then, the mixture was filtered and solids were washed with two 300 ml. portions of benzene which were added to the filtrate. The benzene layer was separated and treated with decolorizing charcoal for 15 minutes. The charcoal was filtered off and the benzene was evaporated away by warming. Crystals of crude product thus obtained were dissolved in 150 ml. of refluxing ethanol for recrystallization. The crystals were filtered off cold and washed with cold ethanol to yield 14.3 g. (46% yield based on 2,7-dihydroxynaphthalene) of 2,7-diphenoxynaphthalene, a new compound. The product was pale yellow and melted at 106–107° C.

*Analysis.*—Found (percent): C, 83.88; H, 5.18. Calculated (percent): C, 84.59; H, 5.16.

EXAMPLE 4

A suspension of 10.3 g. (0.190 mol) of sodium methoxide in 250 ml. of benzene was prepared by stirring under a pure nitrogen stream in a 500 ml. flask. All reactions in the flask are carried out under nitrogen. Then 11.0 g. (0.100 mol) of resorcinol were added. Benzene and methanol were distilled off to leave a white powder of the resorcinol salt. When the salt had cooled, the condenser was arranged to reflux. Then 200 ml. of pyridine were added. The stirred mixture was brought to reflux and 68.5 g. (0.400 mol) of p-bromotoluene was added in a stream through the dropping funnel. This was followed at once by the addition of 3.0 g. of cuprous chloride. The reaction mixture was brought to reflux (117° C.) and held at reflux for 10 hours under a blanket of nitrogen. After this period of heating, the reaction mixture was poured into a solution of 260 ml. of concentrated hydrochloric acid in 2 liters of water. This mixture was stirred and then allowed to stand for 2 days. The water layer was then siphoned off. The organic layer remaining was then fitered. Solids on the filter were washed with 300 ml. of benzene which were added to the filtrate. The benzene solution was washed with 150 ml. of water in three equal portions. Acids were then extracted from the benzene solution by 11.2 g. (0.20 mol) of potassium hydroxide in 200 ml. of water. The benzene solution was washed with two 50 ml. portions of water. Benzene was removed by distillation. Unreacted p-bromotoluene was distilled off at a pressure of 10 mm. of mercury. Distillation was continued at 0.5 mm. to yield 17.7 g. of product, boiling over the range of 191–193° C. at 0.5 mm. of mercury. The yield of meta-bis(para-methylphenoxy)benzene is 61% based on resorcinol.

*Analysis.*—Found (percent): C, 82.41; H, 6.23. Calculated (percent): C, 82.73; H, 6.25.

EXAMPLE 5

A suspension of 10.0 g. (0.185 mol) of sodium methoxide in 150 ml. of benzene was prepared by stirring under pure nitrogen in a 500 ml. flask. All reactions in the flask are carried out under pure nitrogen. Then 11.0 g. (0.100 mol) of resorcinol were added. Methanol and benzene were distilled off to leave the resorcinol salt. When the salt had cooled the condenser was arranged for reflux. A solution of 19.1 g. (0.100 mol) of 1-bromo-4-chlorobenzene to 200 ml. of pyridine was then introduced. The stirred mixture was brought to 110° C. and 3.0 g. of cuprous chloride was added. The mixture was brought to reflux (115° C.) and held at reflux for 10 hours under a blanket of nitrogen. The reaction mixture was then poured into a solution of 250 ml. of concentrated hydrochloric acid and extracted with 150 ml. of benzene. The benzene layer was separated and filtered. The water layer was again extracted with 100 ml. of benzene. Acids were extracted from the combined benzene layers by 10 g. (0.18 mol) of potassium hydroxide in 250 ml. of water. The benzene solution was then washed with four 100 ml. portions of water. Benzene was removed by distillation. The crude product was distilled at a pressure of 0.09 mm. of mercury to give 5.6 g. of a fraction boiling at 175–178° C. The yield of distilled meta-bis(para-chlorophenoxy)benzene is 34%, based on 1-bromo-4-chlorobenzene.

*Analysis.*—Found (percent): C, 64.97; H, 3.53; Cl, 20.3. Calculated (percent): C, 65.27; H, 3.65; Cl, 21.4.

EXAMPLE 6

A suspension of 10.0 g. (0.185 mol) of sodium methoxide in 200 ml. of benzene was prepared by stirring under pure nitrogen in a 500 ml. flask. All reactions in the flask are carried out under pure nitrogen. Then 11.0 g. (0.100 mol) of resorcinol were added. Methanol and benzene were distilled off to leave the resorcinol salt. When the salt had cooled, the condenser was arranged for reflux. Then 200 ml. of pyridine were added. The stirred mixture was brought to reflux and 75.0 g. (0.400 mol) of para-bromoanisol were poured into the mixture. This was followed at once by the addition of 3.0 g. of cuprous chloride. The reaction mixture was brought to reflux (115° C.) and held at reflux for 10 hours under a blanket of nitrogen. Then the mixture was poured into a solution of 250 ml. of concentrated hydrochloric acid in 750 ml. of water, and extracted with 100 ml. of benzene. The benzene layer was separated and filtered. The water layer was again extracted with 100 ml. benzene. Acids were extracted from the combined benzene layers by 10 g. (0.10 mol) of potassium hydroxide in 200 ml. of water. The benzene solution was then washed by three 100 ml. portions of water. Benzene and bromoanisol were removed by distillation at atmospheric pressure to a pot temperature of 260° C. The crude product in the residue crystallized upon cooling. The crude crystals were dissolved in 30 ml. of hot absolute alcohol. The crystals from cooling by ice-water were filtered off and washed with 30 ml. of cold absolute alcohol. These crystals, melting at 84.5–85.5° C., were again recrystallized from 40 ml. of absolute alcohol to give 18.1 g. of crystals melting at 85.5–86.0° C. The yield of twice recrystallized meta-bis(para-methoxyphenoxy)benzene is 56%, based on resorcinol.

*Analysis.*—Found (percent): C, 74.01; H, 5.71. Calculated (percent): C, 74.52; H, 5.63.

EXAMPLE 7

A suspension of 9.6 g. (0.178 mol) of sodium methoxide in 200 ml. of benzene was prepared by stirring under a pure nitrogen stream in a 500 ml. flask. All reactions in the flask are carried out under pure nitrogen. Then 11.0 g. (0.100 mol) of resorcinol were added. Benzene and methanol were distilled off to leave the resorcinol salt. When the salt had cooled, the condenser was arranged for reflux. After addition of 200 ml. of pyridine, the stirred mixture was brought to a temperature of 110° C. and 60 g. (0.30 mol) of 4'-bromoacetophenone were added to the mixture. This was followed at once by the addition of 3.0 g. of cuprous chloride. The reaction mixture was brought to reflux (115° C.) and held at reflux for 6 hours under a blanket of nitrogen. The mixture was then poured into a solution of 250 ml. of concentrated hydrochloric acid in 750 ml. of water. This solution was extracted with 200 ml. of benzene. The benzene layer was filtered, and washed with 100 ml. of water. The benzene layer was next extracted by 300 ml. of 6% aqueous potassium hydroxide in two portions. Two washes with 150 ml. of water freed the benzene layer of alkali. Benzene was removed by distillation at atmospheric pressure. Unreacted 4'-bromoacetophenone was distilled off at a pressure of 4 mm. of mercury. The residue from this distillation crystallized when cooled to room temperature. These crude crystals were recrystallized from 100 ml. of absolute alcohol to give 19.5 g. of product melting at 98.0–98.5° C. Yield of meta-bis-(para-acetylphenoxy)benzene, a new compound, is 60% based on resorcinol.

*Analysis.*—Found (percent): C, 76.03; H, 5.22. Calculated (percent): C, 76.29; H, 5.24.

EXAMPLES 8–16

Using the procedure described in Example 4, a series of runs were carried out using a different solvent in each run. Each run was made at 125° C. except as noted, using 0.05 mol of resorcinol and 0.15 mol bromobenzene with 1.5 g. of cuprous chloride. Pertinent data and results are set forth in the table.

TABLE.—FORMATION OF POLYPHENYL ETHERS IN VARIOUS SOLVENTS

| | | Percent resorcinol converted to— | |
|---|---|---|---|
| Solvent | Reaction time, hrs. | m-Phenoxyphenol | m-Diphenoxybenzene |
| Example: | | | |
| 8 ............... Methyl sulfoxide ............... | 3 | 50 | 11 |
| 9 ............... Pyridine ............... | a 6 | 15 | 74 |
| 10 ............... Pyridine +2% water ............... | b 6 | 22 | 4 |
| 11 ............... Dimethylformamide ............... | 6 | 34 | 4 |
| 12 ............... Di n-butylamine ............... | 6 | 19 | 32 |
| 13 ............... Bis(2-methoxyethyl)ether ............... | 6 | 25 | 21 |
| 14 ............... n-Propyl sulfone ............... | 6 | 23 | 42 |
| 15 ............... Hexamethyl phosphoramide ............... | 5 | 47 | 5 |
| 16 ............... n-Hexanol ............... | 6 | 5 | 0 | a Reaction at reflux temperature of 117° C.
b Reaction at reflux temperature of 112° C.

In Examples 1 through 16, the process of this invention has been demonstrated with a number of solvents and reactants. With the exception of n-propyl sulfone, when an amine solvent is used m-diphenoxybenzene is the predominant product, whereas when other types of solvents are used the predominant product is m-phenoxy phenol. This is particularly noticeable in the case of the particularly preferred solvent, pyridine (Example 9) in comparison to a prior art (but not for this process) solvent, dimethylformamide (Example 12). The undesirable effect of water upon the reaction will be at once apparent from comparing the results of Examples 9 and 10.

As described hereinbefore, cupric salts can be used as the catalyst as well as cuprous salts, which were used in the examples. Furthermore, the copper must be in the form of a salt, i.e., copper oxide and metallic copper are not utilizable in the process of this invention. These factors are demonstrated in the following examples.

EXAMPLE 17

A run was carried out as described in Example 9 (pyridine solvent), with the exception that anhydrous cupric chloride (2.0 g.) was used as the catalyst instead of cuprous chloride. There was obtained a yield 25% meta-phenoxyphenol and 59% meta-diphenoxybenzene.

EXAMPLE 18

A run was carried out as described in Example 9 (pyridine solvent), with the exception that cupric acetylacetonate (3.9 g.) was used as the catalyst instead of cuprous chloride (1.5 g.). There was obtained a yield of 26% meta-phenoxyphenol and 39% meta-diphenoxybenzene.

EXAMPLE 19

A run was carried out as described in Example 9 (pyridine solvent), with the exception that anhydrous cupric sulfate (3.6 g.) was used as the catalyst instead of cuprous chloride (1.5 g.). There was obtained a yield of 23% meta-phenoxyphenol and 71% meta-diphenoxybenzene.

EXAMPLE 20

A run was carried out as described in Example 9 except that CuO was used as the catalyst. No reaction products were obtained. When another run was made using $Cu_2O$ as the catalyst, likewise no reaction products were obtained.

It will be noted from the examples that the synthesis of polyaryl ethers can be carried out in accordance with this invention using a cupric or cuprous salt catalyst. The copper must be in ionic form, in order to effect the formation of a Werner coordination complex with the amine solvent. Copper oxides (Example 20), as used in prior art practice, are not utilizable herein.

EXAMPLE 21

A run was carried out as described in Example 9 (pyridine solvent and cuprous cholride catalyst, with the exception that iodobenzene (0.125 mol) was used instead of bromobenzene (0.15 mol). There was obtained a yield of 16% meta-phenoxyphenol and 6% of meta-diphenoxybenzene.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for carrying out a polyaryl ether synthesis that comprises reacting, at temperatures between about 50° C. and about 200° C., in the absence of molecular oxygen and water, an alkali metal di-salt of a dihydric phenol with an aryl halide reactant, in the presence of a copper salt catalyst selected from the group consisting of cuprous chloride, cupric chloride, cuprous bromide, cupric bromide, cupric acetate, cupric sulfate, cupric acetylacetonate, and cuprous sulfate and in a polar amine solvent selected from the group consisting of amylamine, di-n-propylamine, di-n-butylamine, 2-ethylhexylamine, n-decylamine, aniline, N-amylaniline, m-ethylaniline, toluidine, caprolactam, pyridine, quinoline, pyrazole, thiazole, 2,3-dimethylthiophene, 2-methylthiophene and 1-methyl-2-pyrrolidinone that forms coordinate covalent bonds with copper ions in an amount sufficient to at least partially dissolve the copper salt catalyst and the phenate salt reactant.

2. The method defined in claim 1, wherein said solvent is pyridine.

3. The method defined in claim 1, wherein said solvent is di-n-butylamine.

4. A method for carrying out a polyaryl ether synthesis that comprises reacting, at temperatures between about 100° C. and about 175° C., in the absence of molecular oxygen and water, an alkali metal di-salt of a dihydric phenol selected from the group consisting of resorinol; catechol; and 2,7-dihydroxynaphthalene with an aryl halide selected from the group consisting of bromobenzene; iodobenzene; p-phenoxyphenyl bromide; p-bromotoluene; 1-bromo-4-chlorobenzene; p-bromoanisole; and bromoacetophenone, in the presence of a copper salt catalyst selected from the group consisting of cuprous chloride; cupric chloride; cupric acetylacetonate; and cupric sulfate and in a polar amine solvent selected from the group consisting of pyridine and di-n-butylamine in an amount sufficient to at least partially dissolve the copper salt catalyst and the phenate salt reactant.

5. A method for carrying out a polyaryl ether synthesis that comprises reacting, at temperatures between about 100° C. and about 175° C., in the absence of molecular oxygen and water, a sodium di-salt of resorcinol with bromobenzene in the presence of cuprous chloride catalyst in pyridine solvent in an amount sufficient to at least partially dissolved the copper salt catalyst and the phenate salt reactant.

6. A method for carrying out a polyaryl ether synthesis that comprises reacting, at temperatures between about 100° C. and about 175° C., in the absence of molecular oxygen and water, a sodium salt of resorcinol with p-phenoxyphenyl bromide in the presence of cuprous chloride catalyst and in pyridine solvent in an amount sufficient to at least partially dissolve the copper salt catalyst and the phenate salt reactant.

References Cited

UNITED STATES PATENTS

| 3,083,234 | 3/1963 | Sax | 260—613 |
| 3,192,263 | 6/1965 | Spiegler | 260—612 |
| 3,294,846 | 12/1966 | Livak et al. | 260—613 |
| 3,306,875 | 2/1967 | Hay | 260—613 |

BERNARD HELFIN, Primary Examiner

U.S. Cl. X.R.

260—592